Aug. 22, 1950     W. E. ROBERTSON     2,519,504
CENTER PIN FOR BODY AND TRUCK BOLSTERS
Filed Nov. 15, 1946
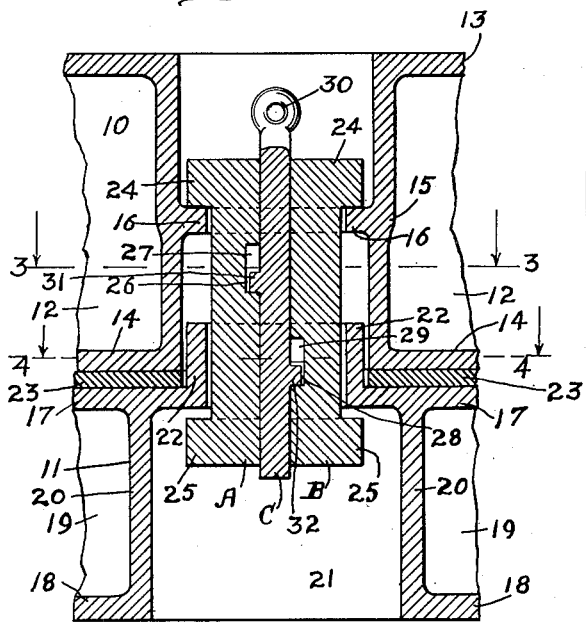
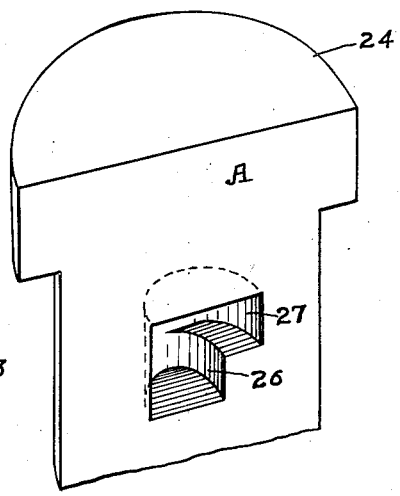
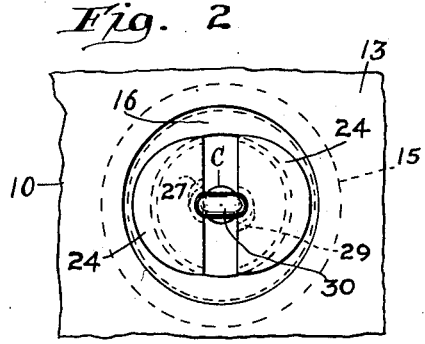
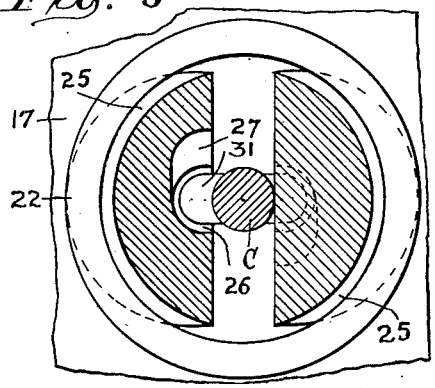
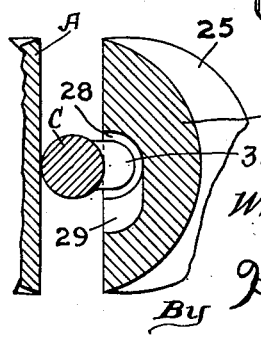
Inventor:
William E. Robertson
By Henry Fuchs
Atty.

Patented Aug. 22, 1950

2,519,504

UNITED STATES PATENT OFFICE 2,519,504

CENTER PIN FOR BODY AND TRUCK BOLSTERS

William E. Robertson, Wilmette, Ill., assignor to W. H. Miner, Inc., Chicago, Ill., a corporation of Delaware Application November 15, 1946, Serial No. 710,200

4 Claims. (Cl. 105—199)

1

This invention relates to improvements in center pins for body and truck bolsters, and more particularly to center pins for connecting the body and truck bolsters of railway cars.

One object of the invention is to provide an improved car construction comprising a locking center pin for connecting the body and truck bolsters of a car and holding the bolsters against vertical separation, wherein the pin comprises two outer sections headed at opposite ends for shouldered engagement with the bolsters, and a filler element for holding the sections spread apart to maintain the shouldered engagement, the filler element being insertable lengthwise between the outer sections and being turnable to bring the same in shouldered engagement with the outer sections, thereby locking the same against accidental removal from between said outer sections.

A more specific object of the invention is to provide a locking center pin, as set forth in the preceding paragraph, wherein the filler element has radially projecting lugs thereon engageable in seats provided on the inner sides of the outer sections to hold said element against rotation and accidental endwise removal when applied between the outer sections.

Other objects of the invention will more clearly appear from the description and claims hereinafter following.

In the accompanying drawing forming a part of this specification, Figure 1 is a vertical sectional view, taken lengthwise of the car through the mid portions of the body and truck bolsters of the underframe structure, illustrating my improvements in connection therewith. Figure 2 is a top plan view of Figure 1. Figure 3 is a horizontal sectional view, on an enlarged scale, corresponding substantially to the line 3—3 of Figure 1. Figure 4 is a horizontal sectional view of the sectional center pin shown in Figures 1, 2, and 3, corresponding substantially to the line 4—4 of Figure 1, said view being on the same scale as Figure 3. Figure 5 is a detail perspective view of the upper end portion of the left hand outer section of my improved center pin, looking toward the left in Figure 1, said view being on an enlarged scale. Figure 6 is a broken, perspective view of the filler element of my improved locking center pin.

In said drawing, 10 indicates the body bolster of the car and 11, the truck bolster. The body bolster is of the cast type and has diaphragm sections 12—12, top and bottom walls 13 and 14, and a center section 15 to accommodate the center pin. The section 15 is of cylindrical tubular form, as shown, and has an annular, inwardly projecting flange 16 between its top and bottom ends, thereby presenting an annular shoulder. The opening defined by this flange is circular

2 and of slightly greater diameter than the shank of the center pin.

The truck bolster 11, which is also preferably a casting, has top and bottom walls 17 and 18, connecting side walls 19—19, and spaced, vertical side walls 20—20. The spaced, vertical side walls define a pocket 21 therebetween, which serves to accommodate the bottom head of the center pin. The top wall of the truck bolster is provided with an upstanding, hollow boss in the form of an annular flange 22, which projects into and is accommodated within the lower end of the tubular section 15 of the body bolster 10. The usual bearing plate or shim 23 is interposed between the body and truck bolsters.

The body bolster is interlocked with the truck bolster by my improved locking center pin, which comprises broadly a pair of outer sections A and B and a combined filler or spreader and locking section or element C.

The two sections A and B are of the same design except as hereinafter pointed out. Each outer section is of substantially semi-cylindrical cross section and is provided at the top thereof with an eccentric, substantially semi-cylindrical, outstanding flange 24. Each section A and B also has a laterally outstanding flange 25 at its lower end, which is similar to the flange 24. However, the flanges 25 may be made concentric with the sections A and B. As will be evident, the flanges 24 and 25 form top and bottom head members of the sections A and B. The inner face or surface of each section A and B is substantially flat. The section A has a locking seat 26 on its inner side near the upper end of the same and a horizontally extending channel 27 leading to the locking seat. The locking seat is located at the inner end of the channel 27, being depressed with respect to the bottom wall of said channel, and is located centrally between the side edges of the flat inner face of the section A. The section B has a locking seat 28 on its inner side, which is similar to the locking seat 26, and has a horizontal channel 29 leading thereto. The seat 28 is located at a lower level than the seat 26, that is, near the lower end of the section B. The channels 27 and 29 of the locking seats 26 and 28 open in opposite directions to guide the locking means of the filler element C toward the seats as said filler element is rotated.

The filler or spreading element C is in the form of a cylindrical bar having an eye member 30 at its upper end to facilitate manipulation of the same. Between its ends, the filler element C has two radially projecting locking lugs 31—32. These lugs 31 and 32 are at diametrically opposite sides of the bar, but at different levels, the lug 31 being positioned to register with the seat 26 of the outer section A and the lug 32 to register with the seat 28 of the outer section B.

As will be evident upon reference to Figure 1, when the center pin, comprising the outer sections A and B and the filler or spreader element C interposed between said outer sections, is applied to the bolsters, the cylindrical shank of the center pin substantially fits the opening defined by the internal flange 16 of the section 15 of the body bolster 10 and the opening defined by the upstanding annular flange or boss 22 of the truck bolster 11. The flanges 24—24 and 25—25 at the top and bottom ends of the outer sections A and B form enlarged top and bottom head portions which hold the pin against removal from the bolsters.

In applying the center pin to the bolsters, the sections A and B are first inserted in the pin receiving openings by passing the same in contracted condition upwardly through said openings, the eccentric flanges 24—24 at the upper ends of said outer sections passing freely through said openings in the collapsed condition of the pin. The sections A and B are then spread apart to bring the flanges thereof in shouldered engagement with the bolsters, and the spreading or filler element is then inserted between the sections A and B, the same having been first turned to align the lugs 31 and 32 thereof with the open space provided between the spaced sections in their spread apart condition. The spreader element is then moved downwardly until the lugs 31 and 32 thereof are respectively brought into alignment with the channels 27 and 29 which lead to the seats 26 and 28. After the lugs have been thus aligned with the channels, the filler element is given a partial turn to align the lugs with the seats, and permitted to drop to engage the lugs within the seats. As will be evident, the weight of the filler element holds the lugs seated in the seats of the outer sections of the pin, thus locking the filler element against rotation and preventing accidental dropping out of the same from between the outer sections.

In removing the pin, the operation is substantially the reverse of that just described, the element C being first lifted to disengage the lugs from the seats and then rotated to align the lugs with the open space between the sections A and B so that the filler element may be freely withdrawn from between said sections. After the filler element has been removed, the sections A and B are contracted and withdrawn from the center pin openings of the bolsters.

I claim:

1. A center pin for body and truck bolsters of a railway car having aligned center pin receiving openings, said pin being insertable lengthwise within said openings, said pin including laterally spaced outer sections headed at opposite ends and a central filler element between said outer sections, said filler element being disposed in the space between said sections and holding the sections of said pin spread apart, a radial retaining lug on said filler element between the ends thereof adapted to pass between said outer sections when the filler element is rotated to a position to align said lug with the space between said sections, and a locking seat on the inner side of at least one of said outer sections inwardly of the heads thereof communicating with said space and within which said lug is engageable to lock said element against rotation.

2. A center pin for body and truck bolsters of a railway car having aligned center pin receiving openings, said pin being insertable lengthwise within said openings, said pin including a pair of outer sections headed at opposite ends and a central filler element between said outer sections, said filler element being in the form of a cylindrical bar, said outer sections being spaced laterally apart in expanded condition of the pin, said filler element holding the pin expanded, a pair of radial retaining lugs on said filler element between the ends thereof adapted to pass between said outer sections in said laterally spaced apart condition when the filler element is rotated to a position to align said lugs with the space between said sections, and a locking seat on the inner side of each of said outer sections, inwardly of the heads thereof, opening into the space between said sections, and within which said lugs are respectively engageable to lock said element against rotation.

3. A center pin for body and truck bolsters of a railway car having aligned center pin receiving openings, said center pin being insertable lengthwise within said openings, said pin including a pair of outer sections headed at opposite ends and a central filler element between said outer sections, said outer sections being spaced apart in the expanded condition of the pin, thereby providing a channel therebetween, said filler element holding the pin expanded, a pair of vertically spaced, radial, retaining lugs at opposite sides of said filler element between the ends thereof, adapted to pass between said outer sections when the filler element is rotated to a position to align said lugs with the channel between said sections, and a locking seat on the inner side of each of said outer sections, inwardly of the heads thereof, opening into said channel, within which said lugs are respectively engageable to lock said element against rotation.

4. A center pin for body and truck bolsters of a railway car having aligned center pin receiving openings, said pin being insertable lengthwise within said openings, said pin including outer sections headed at opposite ends and a central filler element between said outer sections, said filler element being of cylindrical cross section and holding the pin expanded, said outer sections in the expanded condition of the pin being spaced laterally apart, thereby providing a channel therebetween, a radially projecting retaining lug on said filler element adapted to pass between said outer sections when the filler element is rotated to a position to align said lug with the channel between said sections, a locking seat on the inner side of at least one of said outer sections, inwardly of the heads thereof, communicating with said channel and within which said lug is engageable to lock said element against rotation, and a horizontal guideway leading to said seat for accommodating and guiding said lug when the filler element is rotated to register the lug with said seat, said seat being depressed with respect to said guideway.

WILLIAM E. ROBERTSON.

REFERENCES CITED

The following references are of record in the file of this patent:

UNITED STATES PATENTS

| Number | Name | Date |
|---|---|---|
| 2,252,889 | Haseltine | Aug. 19, 1941 |
| 2,252,897 | Olander | Aug. 19, 1941 |